United States Patent
Moorthy et al.

(10) Patent No.: US 10,391,449 B2
(45) Date of Patent: Aug. 27, 2019

(54) NANOFIBER AUGMENTED DIESEL PARTICULATE FILTERS

(71) Applicant: Cummins Emission Solutions Inc., Columbus, IN (US)

(72) Inventors: Kavitha Moorthy, Pune (IN); Matthew P. Henrichsen, Columbus, IN (US); Changsheng C. Su, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/807,204

(22) Filed: Nov. 8, 2017

(65) Prior Publication Data

US 2019/0134563 A1 May 9, 2019

(51) Int. Cl.
| | |
|---|---|
| B01J 35/00 | (2006.01) |
| B01D 53/94 | (2006.01) |
| F01N 3/022 | (2006.01) |
| B01J 35/04 | (2006.01) |
| B01D 39/20 | (2006.01) |

(52) U.S. Cl.
CPC ......... *B01D 53/94* (2013.01); *B01D 39/2082* (2013.01); *B01J 35/04* (2013.01); *F01N 3/0226* (2013.01); *B01D 2239/025* (2013.01); *B01D 2239/0492* (2013.01); *B01D 2239/125* (2013.01); *B01D 2239/1216* (2013.01); *B01D 2255/915* (2013.01); *F01N 2330/06* (2013.01)

(58) Field of Classification Search
CPC .............. B01D 53/94; B01D 39/2082; B01D 2239/025; B01D 2239/0492; B01D 2239/1216; B01D 2239/125; B01D 2255/915; B01J 35/04; F01N 3/0226; F01N 2330/06
USPC ...... 423/212, 239.1; 428/113, 116, 325, 357
See application file for complete search history.

(56) References Cited

U.S. PATENT DOCUMENTS

| | | | |
|---|---|---|---|
| 2008/0241032 A1* | 10/2008 | Zuberi | B01D 53/944 423/235 |
| 2011/0052467 A1* | 3/2011 | Chase | B01D 53/8678 423/239.1 |

FOREIGN PATENT DOCUMENTS

EP    1 834 020    12/2010

OTHER PUBLICATIONS

Bensaid, S., et al., "Soot Combustion Improvement in Diesel Particulate Filters Catalyzed with Ceria Nanofibers," XXXV Meeting of the Italian Section of the Combustion Institute, pp. 1-6 (2012).
Kong, C., et al., Nanofiber deposition by electroblowing of PVA (polyvinyl alcohol), J. Mater. Sci. 44: pp. 1107-1112 (2009).
Um, C., et al., "Electro-spinning and electro-blowing of hyaluronic acid," Biomacromolecules, 5, pp. 1428-1436 (2004).

* cited by examiner

*Primary Examiner* — Patricia L. Hailey
(74) *Attorney, Agent, or Firm* — Foley & Lardner LLP

(57) ABSTRACT

A particulate filter for use in an exhaust aftertreatment system includes a ceramic substrate and a plurality of ceramic nanofibers associated with pores of the ceramic substrate. The plurality of ceramic nanofibers may be positioned on pores of the ceramic substrate, within pore channels of the ceramic substrate, or both on pores of the ceramic substrate and within pore channels of the ceramic substrate.

37 Claims, 4 Drawing Sheets

NANOFIBER AUGMENTED DIESEL PARTICULATE FILTERS

TECHNICAL FIELD

The present application relates generally to the field of aftertreatment systems for internal combustion engines.

BACKGROUND

Diesel particulate filters (DPFs) have been broadly used to capture and remove particulate matter (PM) from exhaust streams of diesel engines. A catalyzed, monolithic ceramic substrate is one filter material conventionally used in such particulate filters because of its ability to withstand harsh temperature and durability requirements in the exhaust aftertreatment and to capture and oxidize soot to $CO_2$ for subsequent release. Current DPF technologies are aimed at identifying the right pore size distribution and mean pore size diameter (MPD) to aid in increasing filtration efficiencies. The reduction in MPD leads to increases in pressure drop across the particulate filters, thereby impacting engine back pressure. Additional challenges arise in maintaining the balance between maximizing filtration capability with the filter's quality factor (i.e. ratio of differential pressure to available area) over a period of time.

SUMMARY

Implementations described herein relate to a particulate filter for use in an exhaust aftertreatment system comprising a ceramic substrate, and a plurality of ceramic nanofibers, the plurality of ceramic nanofibers associated with pores of the ceramic substrate.

In one implementation, the particulate filter further comprises a catalyst layer deposited atop the ceramic substrate. In one implementation, the particulate filter further comprises a catalyst layer deposited atop the plurality of ceramic nanofibers. In one implementation, the plurality of ceramic nanofibers are selectively positioned on a terminus of the pores of the ceramic substrate. In one implementation, the plurality of ceramic nanofibers have a diameter size distribution in the range of less than 1 µm. In one implementation, the plurality of ceramic nanofibers have a diameter size distribution in the range of less than 500 nm. In one implementation, the plurality of ceramic nanofibers have a diameter size distribution in the range of 10 nm to 250 nm. In one implementation, the plurality of ceramic nanofibers have a diameter size distribution in the range of 10 nm to 30 nm. In one implementation, the ceramic substrate has a mean pore size in the range of 4 µm to 80 µm.

In one implementation, the plurality of ceramic nanofibers are positioned on the pores of the ceramic substrate via one of electrospinning, sol-gel technique, laser spinning and electroblowing. In one implementation, the plurality of ceramic nanofibers are positioned on the pores of the ceramic substrate via a suspension or aerosol technique, and wherein the plurality of ceramic nanofibers are dispersed and suspended in a fluid and then the fluid is passed through the pores of the ceramic substrate. In one implementation, the plurality of ceramic nanofibers are formed via one of electrospinning, sol-gel technique, laser spinning and electroblowing. In one implementation, the suspension or the aerosol technique is electroblowing. In one implementation, the plurality of ceramic nanofibers are positioned on the pores of the ceramic substrate by electroblowing. In one implementation, the plurality of ceramic nanofibers are positioned at an entrance of the pores of the ceramic substrate, an exit of the pores of the ceramic substrate, or a combination thereof.

In one implementation, the plurality of ceramic nanofibers are positioned (1) on the pores of the ceramic substrate, (2) within pore channels of the ceramic substrate, or (3) both on the pores of the ceramic substrate and within pore channels of the ceramic substrate. In one implementation, the plurality of ceramic nanofibers are positioned on edge walls of pore channels of the ceramic substrate or in a hollow space between the edge walls of the pore channels. In one implementation, the plurality of ceramic nanofibers span a distance from a first edge wall of the pores to a second edge wall of the pores.

In another implementation, a method of fabricating a particulate filter comprises providing a porous ceramic substrate, associating a plurality of ceramic nanofibers with pores of the porous ceramic substrate, and heat-treating the porous ceramic substrate.

In one implementation, the method further comprises depositing a catalyst layer atop the porous ceramic substrate. In one implementation, the method further comprises depositing a catalyst layer atop the plurality of ceramic nanofibers. In one implementation, the associating comprises selectively positioning the plurality of ceramic nanofibers on a terminus of the pores of the porous ceramic substrate. In one implementation, the associating comprises positioning the plurality of ceramic nanofibers at an entrance of the pores of the porous ceramic substrate, an exit of the pores of the porous ceramic substrate, or a combination thereof. In one implementation, the associating comprises positioning the plurality of ceramic nanofibers (1) on the pores of the porous ceramic substrate, (2) within pore channels of the porous ceramic substrate, or (3) both on the pores of the porous ceramic substrate and within the pore channels of the porous ceramic substrate. In one implementation, the associating comprises positioning the plurality of ceramic nanofibers via a suspension or aerosol technique, and wherein the plurality of ceramic nanofibers are dispersed and suspended in a fluid and then the fluid is passed through the pores of the porous ceramic substrate.

In one implementation, the suspension or the aerosol technique is electroblowing. In one implementation, the associating comprises positioning the plurality of ceramic nanofibers via one of electrospinning, sol-gel technique, laser spinning and electroblowing. In one implementation, the associating comprises positioning the plurality of ceramic nanofibers via electroblowing. In one implementation, the heat-treating converts a plurality of pre-ceramic nanofibers to the plurality of ceramic nanofibers. In one implementation, the plurality of ceramic nanofibers are a plurality of catalyzed ceramic nanofibers. In one implementation, the heat-treating is performed at a temperature in the range of 300° C. to 2000° C. for a time in the range of 0.5 hrs to 24 hrs. In one implementation, the associating comprises positioning the plurality of ceramic nanofibers on edge walls of pore channels of the ceramic substrate or in a hollow space between the edge walls of the pore channels. In one implementation, the plurality of ceramic nanofibers span a distance from a first edge wall of the pores to a second edge wall of the pores.

BRIEF DESCRIPTION

The details of one or more implementations are set forth in the accompanying drawings and the description below.

Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for aftertreatment of internal combustion engines. The various concepts introduced above and discussed in greater detail below may be implemented in any of numerous ways, as the described concepts are not limited to any particular manner of implementation. Examples of specific implementations and applications are provided primarily for illustrative purposes. Embodiments described herein can result in benefits such as providing an improved diesel particulate filter for diesel engines that overcomes the challenges described above. These and other advantageous features will be apparent to those reviewing the present disclosure.

Overview

In some exhaust systems, a sensor module may be located downstream of a selective catalytic reduction (SCR) catalyst to detect one or more emissions in the exhaust flow after the SCR catalyst. For example, a $NO_x$ sensor, a CO sensor, and/or a particulate matter sensor may be positioned downstream of the SCR catalyst to detect $NO_x$, CO, and/or particulate matter within the exhaust gas exiting the exhaust of the vehicle. Such emission sensors may be useful to provide feedback to a controller to modify an operating parameter of the aftertreatment system of the vehicle. For example, a $NO_x$ sensor may be utilized to detect the amount of $NO_x$ exiting the vehicle exhaust system and, if the $NO_x$ detected is too high or too low, the controller may modify an amount of reductant delivered by a dosing module. A CO sensor and/or a particulate matter sensor may also be utilized.

Overview of Aftertreatment System

Figure 1:
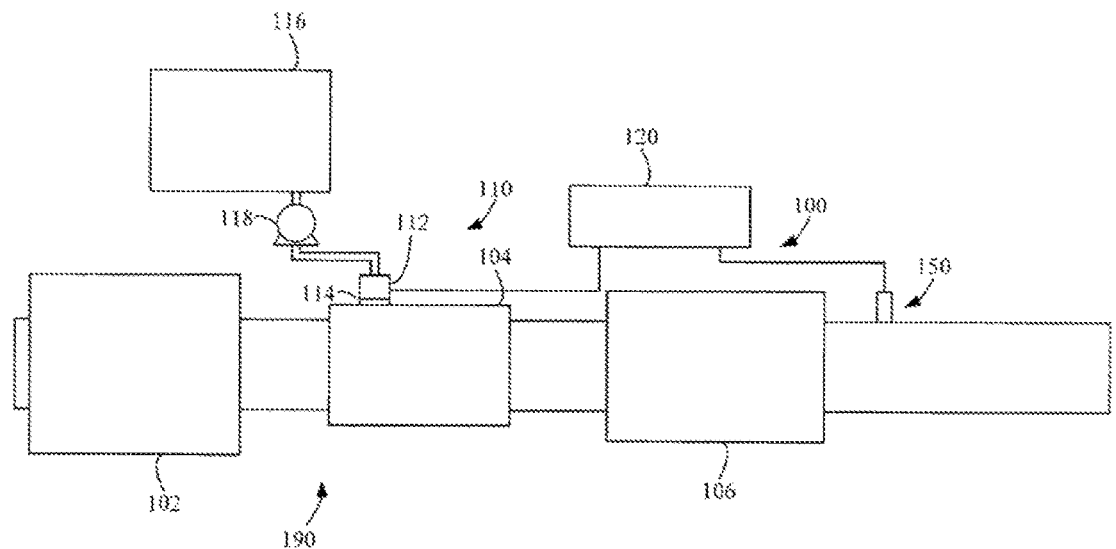
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a particulate filter, for example a DPF 102, the reductant delivery system 110, a decomposition chamber or reactor pipe 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC), in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating (SDPF). In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or six sensors 150, with each sensor 150 located at one of the foregoing positions of the exhaust system 190.

DPF Nanofilter-Augmented Ceramic Substrates

As mentioned above, the DPF and SCR catalyst may be combined into a single unit, such as a DPF with SCR-coating (SDPF). The catalyst material, which is applied as a coating on the ceramic substrate (i.e. a "washcoat"), helps to regenerate the filter and overcome activation energy barriers. Because of the aforementioned problems with optimizing DPF pore size distributions and mean pore size diameters (MPDs), one design of the present disclosure provides for ensuring maximum contact of soot in the SDPF to lower the differential pressure and increase filtration efficiencies. This, in turn, decreases overall fuel consumption by reducing regeneration frequencies. Following the application of the washcoat, the differential pressure across the clean ceramic substrate will increase, with the activity being limited by the available active surface area of the catalyst.

Figure 2:
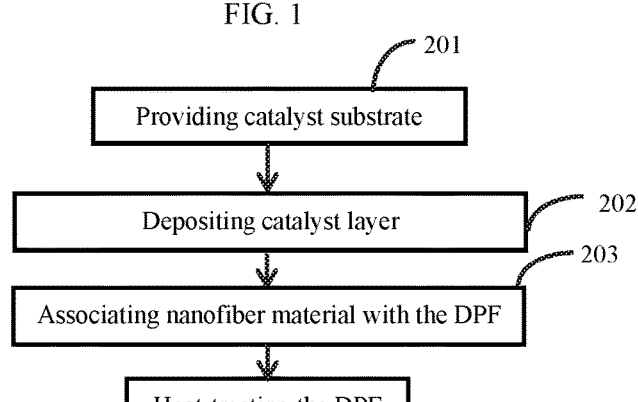
FIG. 2 is flowchart of one implementation for providing nanofilter-augmented DPFs.
Figure 3:
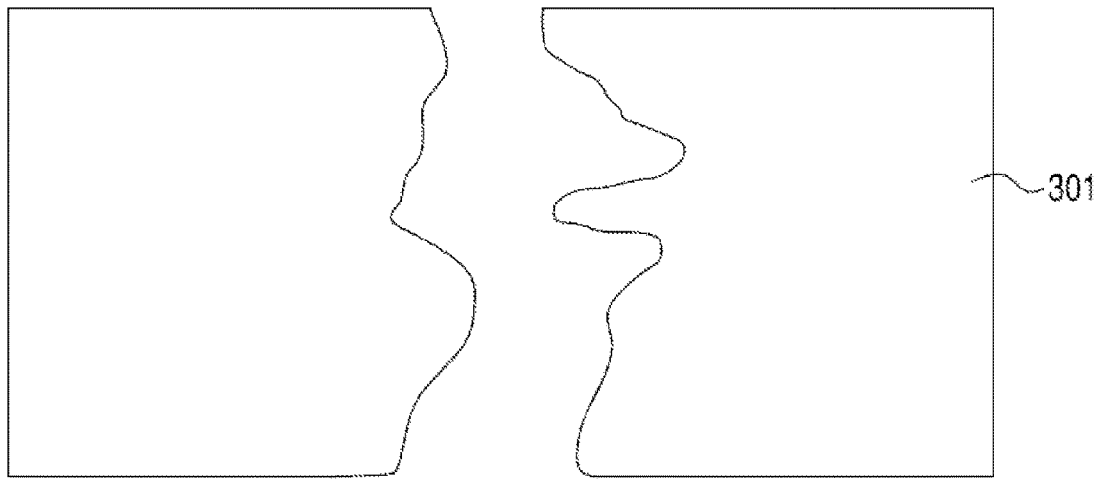
FIG. 3 is a schematic of a ceramic substrate for a diesel particulate filter.
Figure 4:
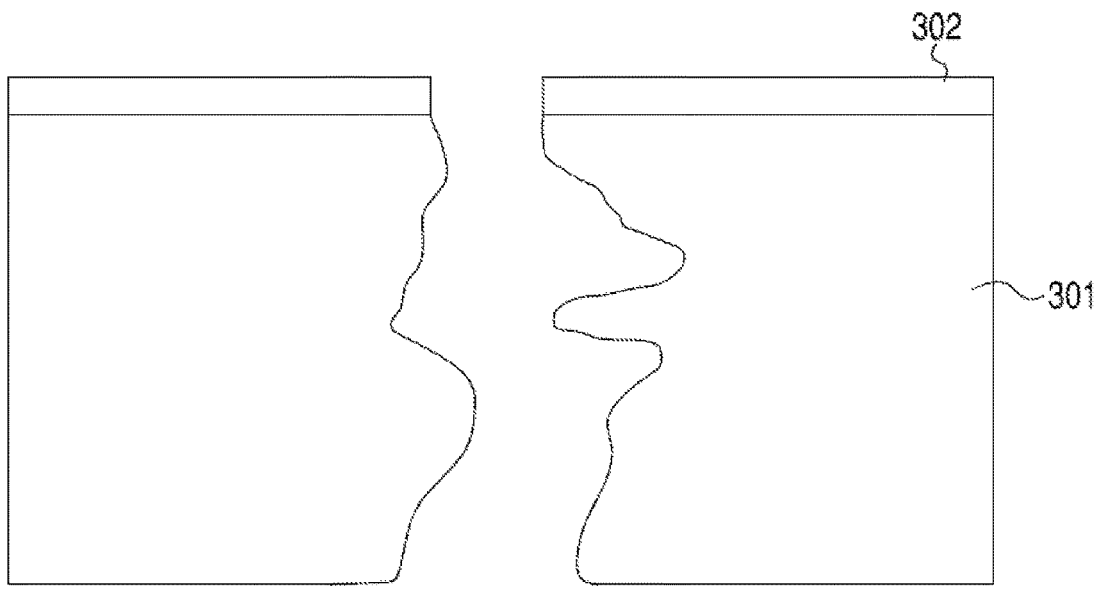
FIG. 4 is a schematic of a catalyst-coated ceramic substrate for a diesel particulate filter according to one embodiment.
Figure 5:
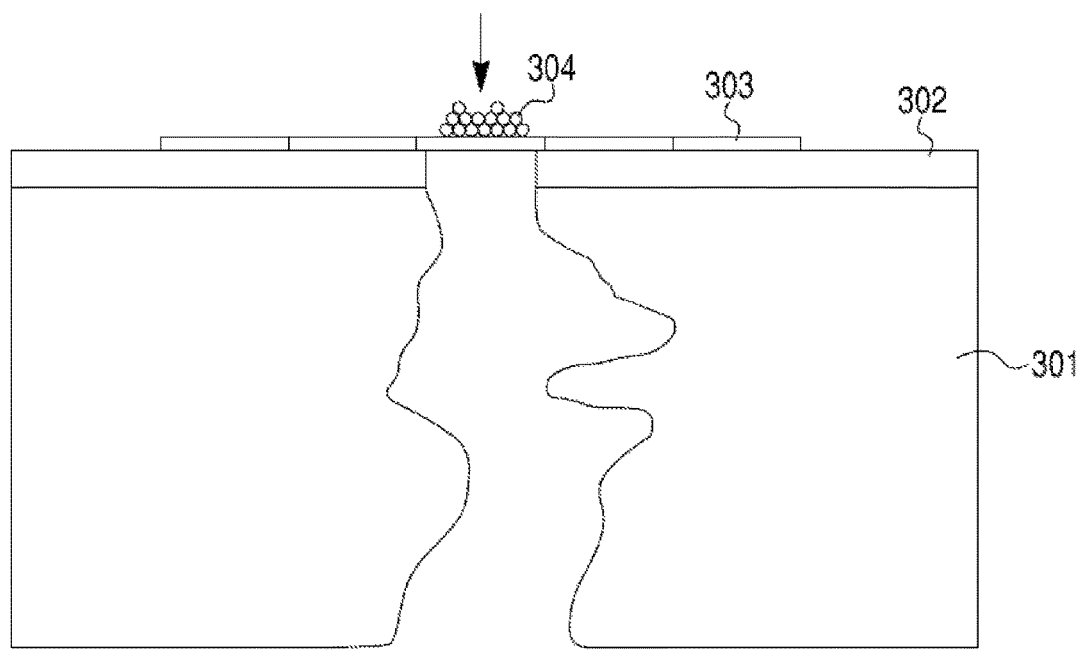
FIG. 5 is a schematic of a nanofiber-augmented diesel particulate filter according to one embodiment.
Figure 6:
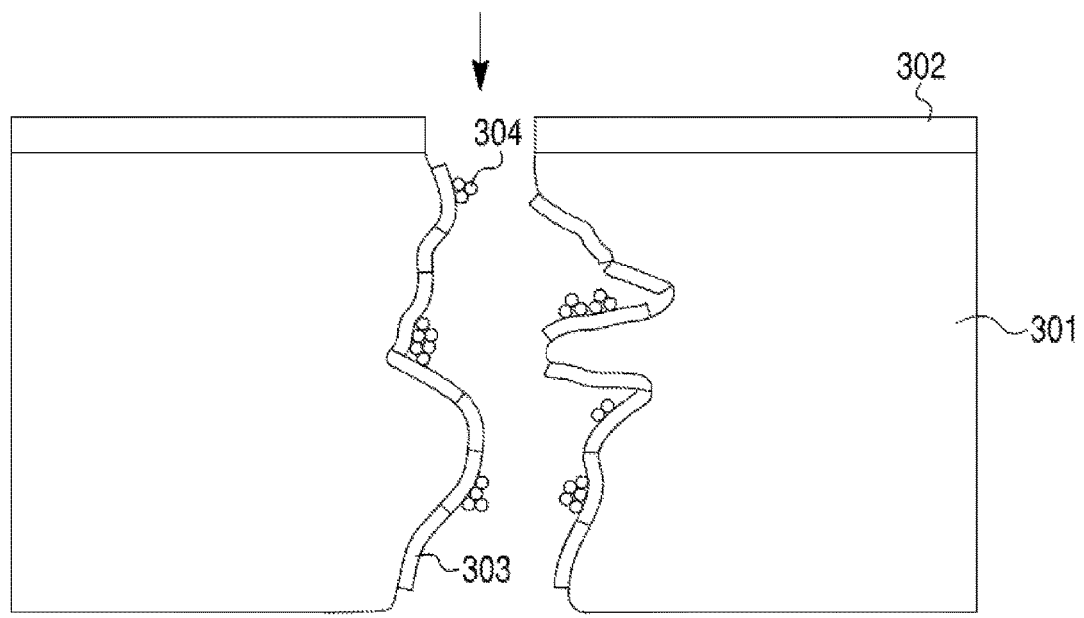
FIG. 6 is a schematic of a nanofiber-augmented diesel particulate filter according to one embodiment.

For the diesel particulate filters disclosed herein, nanofibers made from catalyzed ceramic (i.e. washcoat) material are associated with DPF channels of an un-calcined substrate and then subsequently heat-treating the ceramic substrate. For example, FIG. 2 shows a flowchart of one implementation for providing nanofilter-augmented DPFs. At step 201, a porous ceramic substrate 301 for a DPF is provided (FIG. 3). At step 202, a catalyst layer 302 is deposited atop the porous ceramic substrate 301 (FIG. 4). In one embodiment, the ceramic substrate has a mean pore size in the range of 4 µm to 80 µm. At step 203, nanofibers 303 made from catalyzed ceramic material are associated with DPF channels of an un-calcined ceramic substrate (FIGS. 5 and 6). In one embodiment, a catalyst layer is deposited atop a plurality of nanofibers.

In one embodiment, nanofibers 303 may be associated by selectively positioning the nanofibers 303 on a terminus of the pores of the ceramic substrate 301 (FIG. 5). The nanofibers 303 may be associated, for example, by positioning the nanofibers 303 on pores of the ceramic substrate 301 (FIG. 5), within pore channels of the ceramic substrate 301 (FIG. 6), or by positioning the nanofibers both on pores of the ceramic substrate and within pore channels of the ceramic substrate. In one embodiment, nanofibers 303 may be associated by positioning the nanofibers 303 on edge walls of pore channels of the ceramic substrate 301 or in a hollow space between the edge walls of the pore channels (FIG. 6). In one embodiment, nanofibers may span a distance from a first edge wall of the pores to a second edge wall of the pores.

With respect to FIG. 5, nanofibers 303 may be associated with the pore channels of the ceramic DPF substrate 301 by being positioned atop a catalyst layer 302 and spanning a distance between a first edge wall of the pore channel to a second edge wall of the pore channel. In one embodiment, the nanofibers 303 may be positioned on a terminus of the pores of the ceramic substrate 301 (i.e., at an entrance of the pores, at an exit of the pores, or a combination thereof). FIG. 6 describes an embodiment whereby the nanofibers 303 are positioned within pore channels of the ceramic substrate 301. In one implementation, the nanofibers 303 may be positioned on edge walls of the pore channels of the ceramic substrate 301 (within the pore channels). In another implementation, the nanofibers 303 may be positioned in a hollow space between the edge walls of the pore channels (within the pore channels). In one embodiment, the nanofibers are placed (1) on the pores of the ceramic substrate, (2) within pore channels of the ceramic substrate, or (3) both on the pores of the ceramic substrate and within pore channels of the ceramic substrate.

Figure 7:
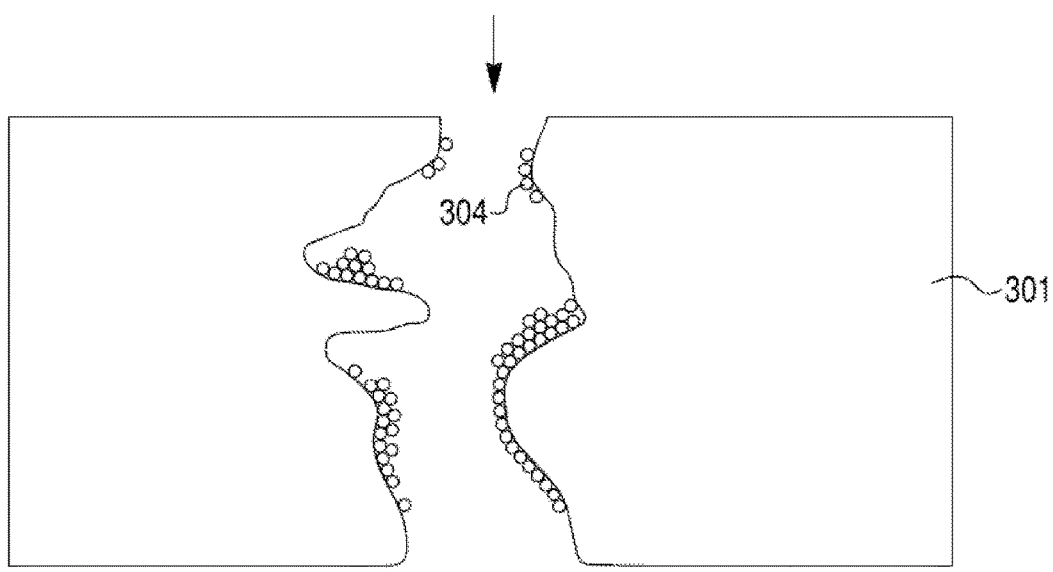
FIG. 7 is a schematic of a conventional diesel particulate filter without nanofibers.

As a result of the association between the nanofibers and the DPF channels, the amount of soot particles 304 trapped within the pore channels of ceramic substrate decreases. In other words, the improvement in particulate matter count reduction is achieved by preferentially placing the nanofibers at a terminus (i.e. either the opening at the entrance or exit) of the pore to function as a bridge barrier or as a secondary filter aid to enhance capture of soot particles within the pore. FIG. 7 is a schematic of a conventional diesel particulate filter without nanofibers and shows an enhanced soot particle 304 buildup from exhaust streams passing through and resulting in increased particulate matter count downstream of the DPF.

In one embodiment, the nanofibers are associated with DPF channels via one of electrospinning, sol-gel technique, laser spinning and electroblowing. In one embodiment, the nanofibers are positioned on pores of the ceramic substrate via a suspension or aerosol technique, such that the nanofibers are dispersed and suspended in a fluid and the fluid is then passed through the pores of the ceramic substrate. At 204, the DPF is heat-treated (calcined) at a predetermined temperate (for example, in the range of 300° C. to 2000° C.) for a predetermined time (for example, in the range of 0.5 hrs to 24 hrs) to reinforce the nanofibers on the walls of DPF. The heat-treating may also convert pre-ceramic nanofibers to ceramic nanofibers. The incorporation of nanofibers containing catalyst into the channels may lead to reductions in differential pressure and lower cost owing to reduced quantity of catalyst material. The benefits of high surface area to volume ratio enable the use of nanofibers as a medium for augmenting the filter performances.

Ceramic nanofibers may be fabricated using techniques such as electrospinning, sol-gel technique, laser spinning and electroblowing. In one embodiment, the fabricated nanofibers have substantially uniform diameter (i.e., with a variance of no more than about plus or minus five (5) percent). In one embodiment, the fabricated nanofibers have a diameter size distribution in the range of less than 1 µm. In one embodiment, the fabricated nanofibers have a diameter size distribution in the range of less than 500 nm. In one embodiment, the fabricated nanofibers have a diameter size distribution in the range of 10 nm to 250 nm. In one embodiment, the fabricated nanofibers have a diameter size distribution in the range of 10 nm to 30 nm. In one embodiment, the nanofibers are coated into channels of diesel particulate filters and then subsequently heat-treated (calcined) at a temperature in the range of 300° C. to 2000° C. for a time in the range of 0.5 hrs to 24 hrs to reinforce the nanofibers on the walls of DPF. In one embodiment, the ceramic nanofibers were fabricated using electroblowing wherein a high speed air current may be used to push a ceramic slurry or pre-ceramic polymer or sol-gel solution through a dye. In one embodiment, the dye may contain orifices located at positions similar (i.e. mirror) to that of cell openings in partially plugged diesel particulate filters. After the nanofibers have been fabricated and positioned on top of the pores of the ceramic substrate, the electroblown ceramic nanofibers were catalyzed.

In one embodiment, the nanofibers may be positioned at an entrance of the pores of the ceramic substrate, an exit of the pores of the ceramic substrate, or a combination thereof. In one embodiment, the nanofibers may be positioned within DPF channels. In one embodiment, the nanofibers may be positioned either on pores of the DPF, within DPF channels or a combination thereof. The resulting ceramic substrate-ceramic nanofiber-SCR catalyst structure has a higher availability of catalyst for soot capture and oxidation.

As described above, nanofibers may be placed in the pore opening by various methods. Wet depositions may involve modification of the surface charge of the fiber to aid in improving surface forces for soot capture. In one embodiment, to achieve surface charge modification, the nanofibers are placed in solvents containing charge modifiers for a predetermined time to ensure it the nanofibers are oppositely charged to the washcoat. After the predetermined time, the solvent-fiber composition is drawn through a clean ceramic substrate by vacuum to allow deposition of the fibers on the pore opening. In one embodiment, the nanofibers may be positioned within DPF channels. In one embodiment, the nanofibers may be positioned either on pores of the DPF or within DPF channels or a combination thereof. Dry deposition may use air as the fluid for transporting fibers onto pore openings. In another embodiment, nanofibers may be spun directly on the ceramic substrate.

The nanofibers described herein improve particulate number filtration with minimal impact on differential pressure, as the nanofibers are selectively deposited in a wall-flow diesel particulate filter. Nanofibers may be made during the deposition process or beforehand, and deposited or grown in at desired positions (ideally, near the entrance or exit of any large pores in the filter wall) using various techniques described herein. Nanofibers cost may be lowered by optimizing or modifying the fabrication and positioning procedure based on type of DPF material, mean pore size of the substrate, quantity needed.

The nanofibers described herein may be incorporated to form a new generation diesel particulate filters that reduces the total cost of ownership to a potential customer because the nanofiber is capable of aiding in improving filtration efficiencies; reducing catalyst loading and back pressure of the engine; and reducing the dependency of substrate pore size optimization. Moreover, the nanofibers may be used to help in meeting regulatory particle number (PN) emission requirements while maintaining a lower differential pressure in comparison with filters having a heavier washcoat or filters with smaller mean substrate pore size. Practically, this would reduce customer fuel consumption for devices using nanofiber-augmented DPF technology.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. For example, while the use of this technology is exemplified for diesel particulate filter (DPF) nanofilter-augmented ceramic substrates, it should be understood that the present disclosure is not limited to this application. Rather diesel particulate filters for diesel engines are merely one embodiment meant to exemplify automotive applications. It should also be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A particulate filter for use in an exhaust aftertreatment system, the particulate filter comprising:
   a porous ceramic substrate comprising pores; and
   a plurality of ceramic nanofibers that are distinct from the porous ceramic substrate and that are associated with the pores of the porous ceramic substrate.

2. The particulate filter of claim 1, further comprising a catalyst layer deposited atop the porous ceramic substrate.

3. The particulate filter of claim 1, further comprising a catalyst layer deposited atop the plurality of ceramic nanofibers.

4. The particulate filter of claim 1, wherein the plurality of ceramic nanofibers are selectively positioned on a terminus of the pores of the porous ceramic substrate.

5. The particulate filter of claim 1, wherein the plurality of ceramic nanofibers have a diameter size distribution in the range of less than 1 µm.

6. The particulate filter of claim 5, wherein the plurality of ceramic nanofibers have a diameter size distribution in the range of less than 500 nm.

7. The particulate filter of claim 6, wherein the plurality of ceramic nanofibers have a diameter size distribution in the range of 10 nm to 250 nm.

8. The particulate filter of claim 7, wherein the plurality of ceramic nanofibers have a diameter size distribution in the range of 10 nm to 30 nm.

9. The particulate filter of claim 1, wherein the porous ceramic substrate has a mean pore size in the range of 4 µm to 80 µm.

10. The particulate filter of claim 1, wherein the plurality of ceramic nanofibers are positioned at an entrance of the pores of the porous ceramic substrate, an exit of the pores of the porous ceramic substrate, or a combination thereof.

11. The particulate filter of claim 1, wherein the plurality of ceramic nanofibers are positioned (1) on the pores of the porous ceramic substrate, (2) within pore channels of the porous ceramic substrate, or (3) both on the pores of the porous ceramic substrate and within pore channels of the porous ceramic substrate.

12. The particulate filter of claim 1, wherein the plurality of ceramic nanofibers are positioned on edge walls of pore channels of the porous ceramic substrate or in a hollow space between the edge walls of the pore channels.

13. The particulate filter of claim 1, wherein the plurality of ceramic nanofibers span a distance from a first edge wall of the pores to a second edge wall of the pores.

14. A method of fabricating a particulate filter, the method comprising:
   providing a porous ceramic substrate comprising pores;
   providing a plurality of ceramic nanofibers that are distinct from the porous ceramic substrate;
   associating the plurality of ceramic nanofibers with the pores of the porous ceramic substrate; and
   heat-treating the porous ceramic substrate.

15. The method of claim 14, further comprising depositing a catalyst layer atop the porous ceramic substrate.

16. The method of claim 14, further comprising depositing a catalyst layer atop the plurality of ceramic nanofibers.

17. The method of claim 14, wherein the associating comprises selectively positioning the plurality of ceramic nanofibers on a terminus of the pores of the porous ceramic substrate.

18. The method of claim 14, wherein the associating comprises positioning the plurality of ceramic nanofibers at an entrance of the pores of the porous ceramic substrate, an exit of the pores of the porous ceramic substrate, or a combination thereof.

19. The method of claim 14, wherein the associating comprises positioning the plurality of ceramic nanofibers (1) on the pores of the porous ceramic substrate, (2) within pore channels of the porous ceramic substrate, or (3) both on the pores of the porous ceramic substrate and within the pore channels of the porous ceramic substrate.

20. The method of claim 14, wherein the associating comprises positioning the plurality of ceramic nanofibers via a suspension or aerosol technique, and wherein the plurality of ceramic nanofibers are dispersed and suspended in a fluid and then the fluid is passed through the pores of the porous ceramic substrate.

21. The method of claim 20, wherein the suspension or the aerosol technique is electroblowing.

22. The method of claim 14, wherein the associating comprises positioning the plurality of ceramic nanofibers via one of electrospinning, sol-gel technique, laser spinning and electroblowing.

23. The method of claim 22, wherein the associating comprises positioning the plurality of ceramic nanofibers via electroblowing.

24. The method of claim 14, wherein the heat-treating converts a plurality of pre-ceramic nanofibers to the plurality of ceramic nanofibers.

25. The method of claim 14, wherein the plurality of ceramic nanofibers are a plurality of catalyzed ceramic nanofibers.

26. The method of claim 14, wherein the heat-treating is performed at a temperature in the range of 300° C. to 2000° C. for a time in the range of 0.5 hrs to 24 hrs.

27. The method of claim 14, wherein the associating comprises positioning the plurality of ceramic nanofibers on edge walls of pore channels of the porous ceramic substrate or in a hollow space between the edge walls of the pore channels.

28. The method of claim 14, wherein the plurality of ceramic nanofibers span a distance from a first edge wall of the pores to a second edge wall of the pores.

29. A particulate filter for use in an exhaust aftertreatment system, the particulate filter comprising:
   a ceramic substrate; and
   a plurality of ceramic nanofibers associated with pores of the ceramic substrate;

wherein the plurality of ceramic nanofibers have a diameter size distribution in the range of less than 1 µm.

30. The particulate filter of claim 29, wherein the plurality of ceramic nanofibers have a diameter size distribution in the range of less than 500 nm.

31. The particulate filter of claim 30, wherein the plurality of ceramic nanofibers have a diameter size distribution in the range of 10 nm to 250 nm.

32. The particulate filter of claim 31, wherein the plurality of ceramic nanofibers have a diameter size distribution in the range of 10 nm to 30 nm.

33. A particulate filter for use in an exhaust aftertreatment system, the particulate filter comprising:
   a ceramic substrate; and
   a plurality of ceramic nanofibers associated with pores of the ceramic substrate;
   wherein the ceramic substrate has a mean pore size in the range of 4 µm to 80 µm.

34. A method of fabricating a particulate filter, the method comprising:
   providing a porous ceramic substrate;
   associating a plurality of ceramic nanofibers with pores of the porous ceramic substrate; and
   heat-treating the porous ceramic substrate;
   wherein the associating comprises positioning the plurality of ceramic nanofibers via a suspension or aerosol technique, and wherein the plurality of ceramic nanofibers are dispersed and suspended in a fluid and then the fluid is passed through the pores of the porous ceramic substrate.

35. The method of claim 34, wherein the suspension or the aerosol technique is electroblowing.

36. A method of fabricating a particulate filter, the method comprising:
   providing a porous ceramic substrate;
   associating a plurality of ceramic nanofibers with pores of the porous ceramic substrate; and
   heat-treating the porous ceramic substrate;
   wherein the associating comprises positioning the plurality of ceramic nanofibers via one of electrospinning, sol-gel technique, laser spinning and electroblowing.

37. The method of claim 36, wherein the associating comprises positioning the plurality of ceramic nanofibers via electroblowing.

* * * * *